E. G. THOMAS.
INDICATING MECHANISM FOR SCALES.
APPLICATION FILED FEB. 1, 1918.
1,318,511.
Patented Oct. 14, 1919.
3 SHEETS—SHEET 1.
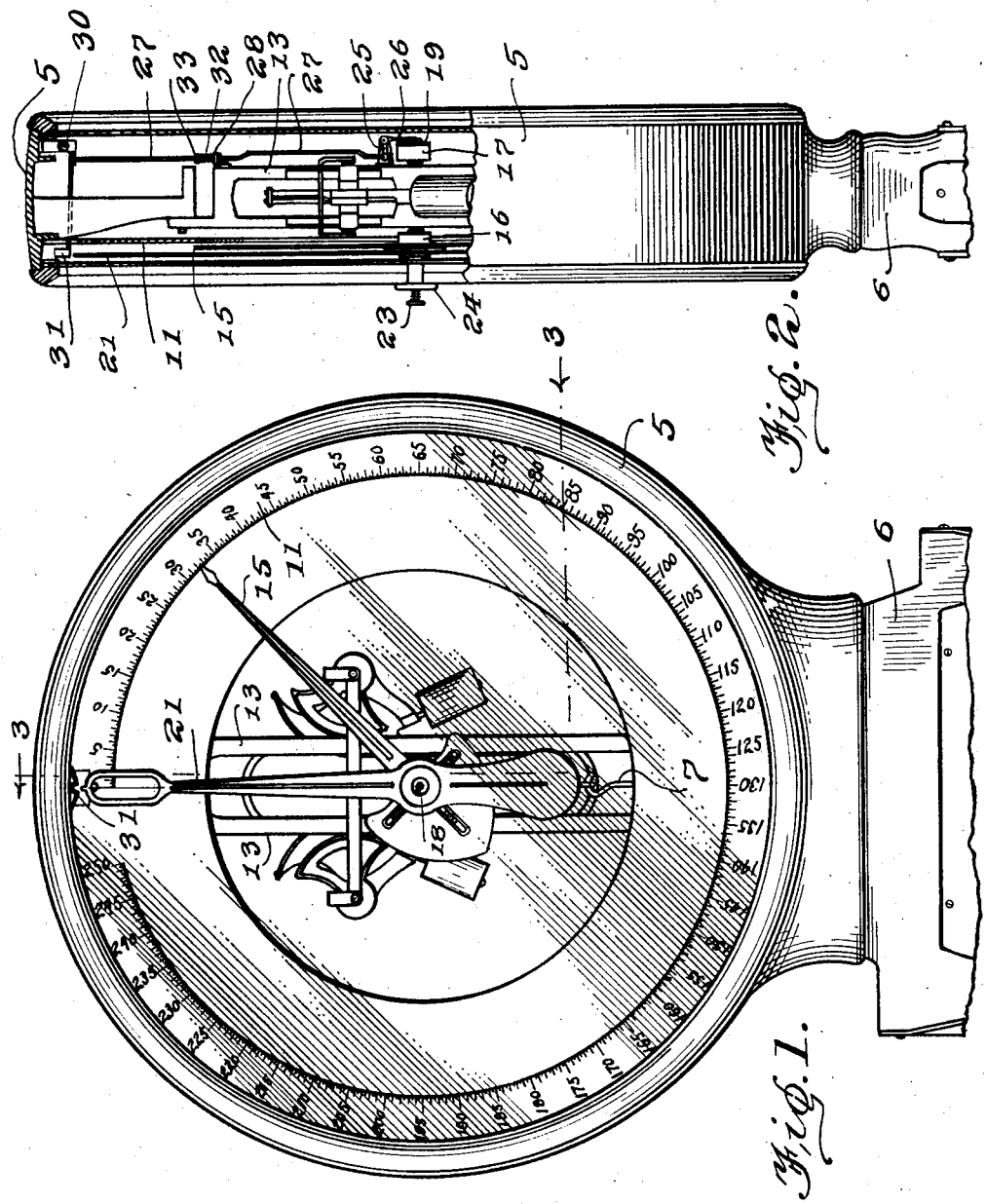
Witnesses
Inventor
Edward G. Thomas
By George R. Frye
Attorney

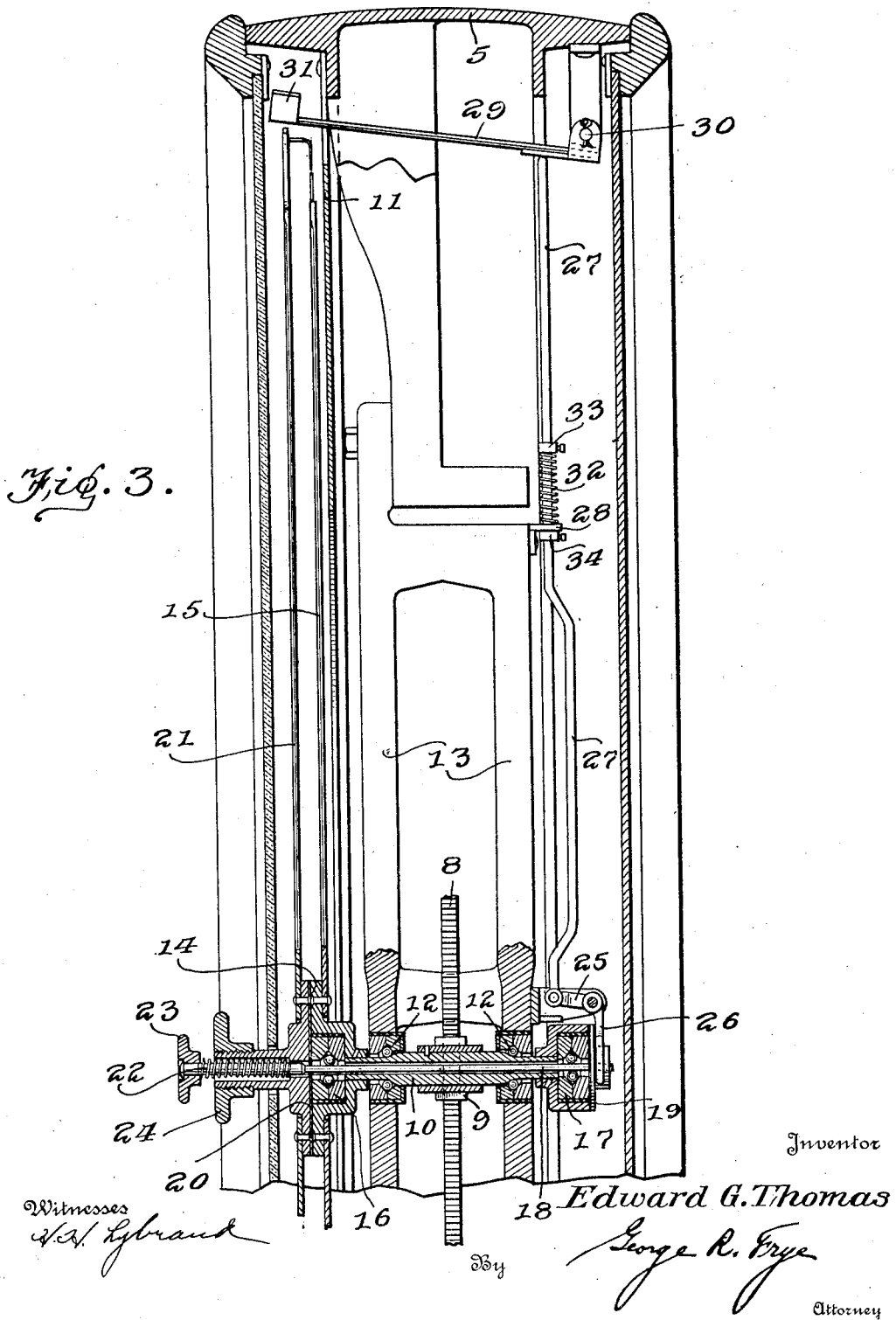

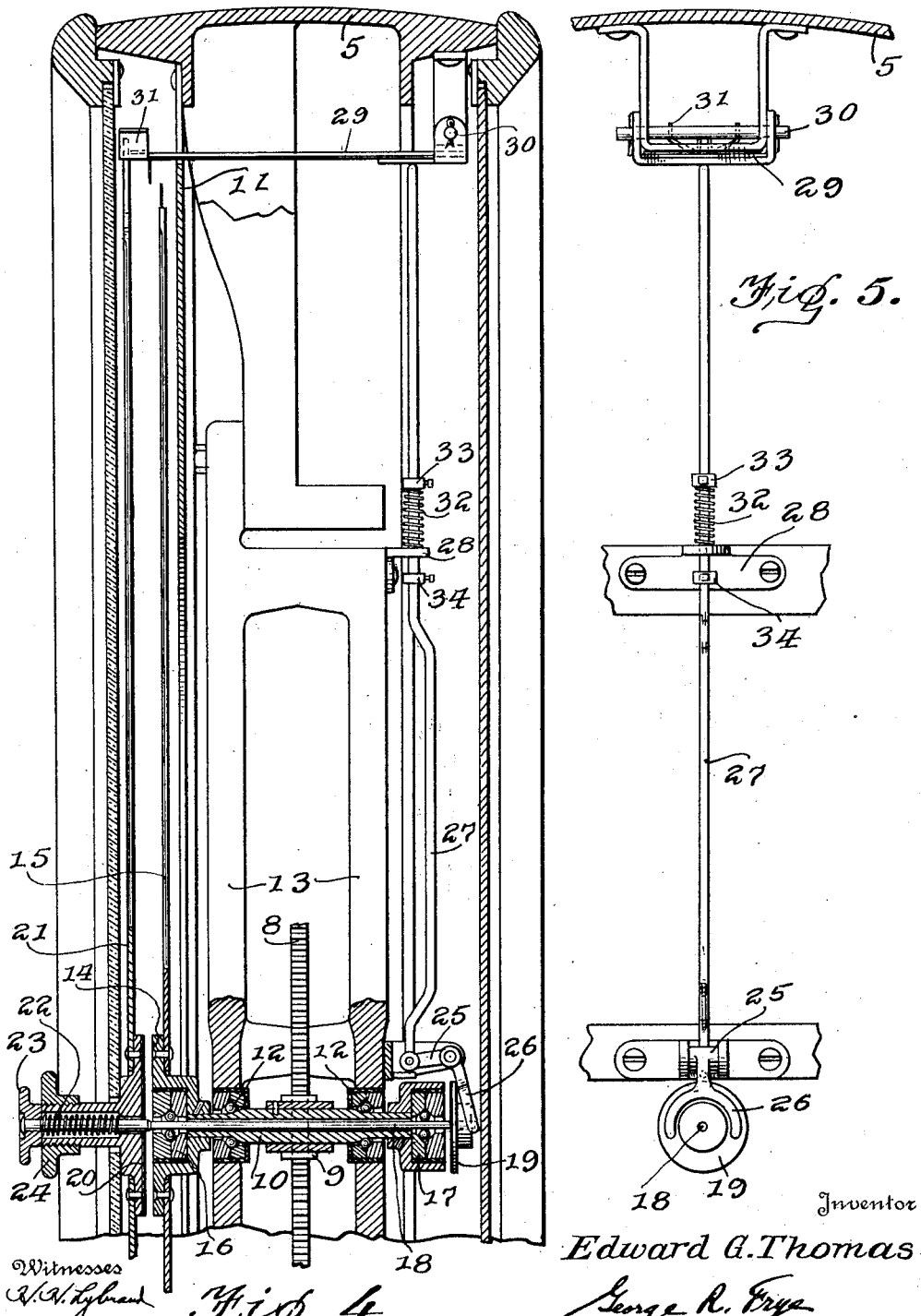

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

INDICATING MECHANISM FOR SCALES.

1,318,511.	Specification of Letters Patent.	Patented Oct. 14, 1919.

Application filed February 1, 1918. Serial No. 214,801.

*To all whom it may concern:*

Be it known that I, EDWARD G. THOMAS, a citizen of the United States, residing at Toledo, in the county of Lucas and State of Ohio, have invented certain new and useful Improvements in Indicating Mechanism for Scales, of which the following is a specification.

This invention relates to weighing scales, and more particularly to indicating means therefor arranged to conveniently and accurately indicate the net, gross and tare weights of articles being weighed.

The primary object of the invention is to provide a scale having a plurality of indicator hands positioned to indicate in unison the weights of articles upon the scale platform, while one or more of the indicating hands may be adjusted relatively to the other or others of said indicating hands, enabling the operator to re-set such indicating hands from any desired position without disturbing the remaining indicator hands.

Furthermore, this invention provides means for indicating multiple weighings, wherein packages or articles may be separately weighed without necessitating the removal of any of them from the scale platform until all have been weighed, thereby enabling the operator to keep together an invoice of goods for delivery or shipment; or for accurately weighing the several ingredients that enter into a compound of medicine, a mixture of bread, etc., or the formula of an alloy of metals, the compounding whereof may be performed without necessitating the removal of the container or holding vessel from the scale platform.

With the above and other objects in view which will readily appear when the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a front elevation of the upper portion of a scale showing an embodiment of my invention;

Fig. 2 is a side elevation thereof with parts broken away to portray the interior mechanism;

Fig. 3 is a central sectional view taken substantially on the line 3—3 of Fig. 1;

Fig. 4 is a view similar to Fig. 3 with the operating parts in a different position, and Fig. 5 is a detail elevation of the means for positioning the adjustable hand at zero.

In the drawings, 5 designates the casing of a scale adapted to inclose the weighing mechanism and supported upon a suitable column 6, the lower end of which rests on the platform mechanism (not shown). It is to be understood that any suitable platform or platform lever mechanism may be employed in connection with the weighing mechanism of the scale, and the weighing mechanism herein shown is illustrated merely for the purpose of showing one application of the indicating mechanism upon a well-known scale. The particular pendulum weighing mechanism herein shown has been found to successfully demonstrate the capabilities of this invention and comprises a double pendulum scale adapted to be suitably connected with the platform lever mechanism through the medium of an adjustable hook rod 7 and so arranged and positioned that upon the placing of a load upon the scale platform the pendulums will be swung upwardly into a position counterbalancing the weight of the load on the platform, connection being made from the weighing mechanism whereby the upward movement of the pendulums will be transmitted to the indicating mechanism through a rack 8 meshing with a pinion 9 on the indicator shaft 10. A plurality of indicator hands are arranged to be rotated upon movement of the indicator shaft and coöperate with the dial 11 to indicate the weight or weights of articles placed upon the scale platform. Inasmuch as the present invention is not dependent for its operation upon any particular form of weighing mechanism, no attempt is made in this application to show a complete scale mechanism nor to portray the action of the scale in its load-counterbalancing or weighing operations, only so much of the pendulum weighing mechanism being shown as is necessary to clearly disclose the operation and co-action of the claimed invention.

The indicator shaft 10 is formed as a hollow sleeve resting in ball bearings 12 mounted in the framework 13 of the scale, these ball bearings being arranged one on each side of the pinion 9 (see Figs. 3 and 4). Adjacent its forward end the indicator shaft carries a clutch member 14 to the hub of which is secured the fixed indicator hand 15. In the hub of the clutch member 14 is provided a ball-bearing race 16 which coöperates with a similar ball race 17 mounted on the rear portion of the indicator shaft in centering a transversely-extending shaft 18 carrying at its rear extremity the disk 19 for a purpose presently to be described. Adjacent the forward end of the shaft 18 I provide a clutch member 20 carrying a carefully balanced adjustable indicator hand 21 and adapted to coöperate with the clutch member 14 on the fixed indicator hand. The clutch member 20 is freely slidable on and rotatable relatively to the shaft 18, and is normally maintained in yielding engagement with the clutch member 14 through the medium of a spring 22 surrounding the shaft 18 and abutting at its opposite ends against the clutch member 20 and a button 23 fixed at the forward extremity of the shaft. A knob 24 is preferably arranged on the hub of the clutch member 20 in position to be conveniently grasped by the operator when it is desired to adjust the hand 21 relatively to the fixed indicator hand, as will now be described.

When an article is placed upon the scale platform the weighing mechanism of the scale is moved to offset the weight of such article and in so doing rotates the indicator shaft 10 through the medium of the pinion 9 and rack 8, thereby rotating the fixed indicator hand 15 through an arc sufficient to indicate on the dial 11 the weight of such article. Since normally the clutch member 20 carrying the indicator hand 21 is pressed into engagement with the clutch member 14 on the fixed indicator hand 15, this indicating hand 21 will likewise be rotated through the same arc, and operated in unison with the indicator hand 15 in indicating the weight of the article. Thus, when it is desired to secure only the gross weight of an article or articles, the fixed and adjustable indicator hands operate together to indicate such weights. When, however, it is desired to utilize the scale as a net, gross and tare weight indicator, the container, such as a box or holding vessel, is first placed on the platform and both of the indicating hands 15 and 21 are rotated by the weighing mechanism until the weight of the container is indicated on the dial 11. The adjustable indicator hand 21 is then manually returned to the zero position as follows: The knob 24 on the hub of the clutch member 20 is grasped between the fingers and the thumb is pressed against the button 23 on the slidable shaft 18, the members 23 and 24 being then moved toward each other. By such movements the clutch member 20 is separated from the companion clutch member 14 on the fixed indicator hand and the shaft 18 is slid through the hollow indicator shaft to force the disk 19 rearwardly. The adjustable indicator hand 21 is now free to be returned to zero by the rotation of the knob 24, without causing the fixed indicator hand to be moved from the position which it assumed under the action of the load upon the scale. The rearward movement of the disk 19 is utilized to operate a stop or guide mechanism at the zero position to facilitate the placing of the adjustable indicator hand in exact alinement with the zero indication on the dial. A preferred form of such zero guide mechanism is shown in Figs. 4 and 5, and comprises a bell-crank lever 25 having one arm thereof formed as a yoke 26 and engaging the disk 19 so that upon rearward movement of the disk the lever 25 will be rocked on its fulcrum. The other arm of the bell-crank lever is pivotally connected with an upwardly-extending push rod 27 guided for longitudinal movement in apertured lugs 28 on the scale frame and contacting at its upper extremity a lever 29 pivoted, as at 30, adjacent one extremity and carrying at its opposite extremity a guide member 31 shown in front elevation in Fig. 1 of the drawings. A spring 32 is arranged between a collar 33 on the push rod 27 and one of the apertured lugs 28 whereby the push rod will normally be pressed upwardly to a position sufficiently elevated to hold the lever 29 with its guide member 31 out of contact with the indicator hand 21. A collar 34 may be fixed upon the push rod 27 in position to limit the upward movement of said rod, as desired. When the push rod 27 is moved downwardly through the rocking of the bell-crank 25 upon the rearward movement of the disk 19, the lever 29 is permitted to fall to such position as will permit the guide member 31 to engage the upper extremity of the adjustable indicator hand 21. As this indicator hand is rotated toward zero it slides along the inclined side faces of the guide member 31 and enters the central guiding notch, which, it will be understood, is arranged in direct alinement with the zero indication on the dial. When the adjustable indicator hand has been so returned to zero the knob 24 and button 23 are released, the spring 22 thereupon returning the clutch member 20 into engagement with the clutch member 14 on the fixed indicator hand and simultaneously moving the button 23 forward so that the disk 19 is retracted, permitting the spring 32 to return the push rod 27 to its original position and removing the guide member 31 from engagement with the indicating hand 21. The commodity to be weighed is then placed in the container, whereupon the hands 15 and 21 are again rotated until the combined weight of the commodity and container is offset by the scale mechanism, the fixed indicator hand 15 showing on the dial this combined or gross weight. The adjustable indicator hand 21, however, moving from zero on the last weighing, will show only the weight of the commodity in the container, or the net weight desired. The tare—i. e., the weight of the container—is, of course, shown between the fixed and adjustable hands. Should it be desired to weigh other articles in the same container without removing this commodity or ingredient—for instance, in the mixing of compounds—the indicating hand can again be returned to zero as hereinbefore described and the next commodity placed upon the platform of the scale. The two hands will thereupon rotate together until the combined weights of all the articles on the platform are offset and indicated by the fixed hand 15. The weight of the last commodity placed on the platform will be shown by the indicating hand 21. This operation may be repeatedly performed until the full capacity of the dial has been reached, and in case the scale is also equipped with beams the weights thus totaled can be transferred to such increased capacity beams, thereby returning both the fixed and adjustable hands into registration with the zero graduation, and additional weighings can be continued until the full weighing capacity of the scale is reached.

While it is apparent that the illustrated embodiment of my invention herein disclosed is well calculated to adequately fulfil the objects primarily stated, it is to be understood that my invention is susceptible to variation, modification and change without departing from the spirit and scope of the invention as set forth in the subjoined claims.

Having described my invention, I claim:

1. In a scale and in combination with the weighing mechanism thereof, a hollow shaft, an indicator hand mounted thereon, a shaft concentric with the hollow shaft and rotatable therein, a second indicator hand mounted upon the latter shaft, means whereby both of said shafts and indicator hands are rotated from the weighing mechanism of the scale, and means for independently moving the second indicator hand relatively to the first indicator hand.

2. In a scale and in combination with the weighing mechanism thereof, a pair of indicator hands adapted to be simultaneously driven by the weighing mechanism, a hollow shaft carrying one of the indicator hands, a shaft concentric with said hollow shaft carrying the other of said indicator hands, detachable members normally connecting the shafts for simultaneous rotation, and means for varying the relative angular position of said hands.

3. In a scale and in combination with the weighing mechanism thereof, a pair of indicator hands, a hollow shaft connected with the weight-offsetting mechanism for rotation thereby and carrying one of said indicator hands, a shaft concentric with said hollow shaft and carrying the other indicator hand, clutch members carried by each of said shafts and normally engaging each other, and means for disengaging the clutch members when desired to permit varying the angular position of one indicator hand relative to the other.

4. In a scale and in combination with the weighing mechanism thereof, a pair of indicator hands, a hollow shaft connected with the weight-offsetting mechanism for rotation thereby and carrying one of said hands, a second shaft concentric with said hollow shaft arranged for rotative movement therein and carrying the other indicator hand, clutch members respectively secured to said hollow shaft adjacent its opposite ends, coöperating clutch members secured to said second shaft and normally engaging the clutch members upon the hollow shaft, and means for disengaging the clutch members when desired to permit varying the angular position of one indicator hand relatively to the other.

5. In a scale and in combination with the weighing mechanism thereof, a pair of indicator hands, a hollow shaft connected with the weight-offsetting mechanism for rotation thereby and carrying one of said hands, a second shaft concentric with said hollow shaft arranged for rotative movement therein and carrying the other indicator hand, clutch members respectively secured to said hollow shaft adjacent its opposite ends, coöperating clutch members secured to said second shaft, a spring normally pressing the latter clutch members into engagement with those upon the hollow shaft, and means for retracting the latter clutch members when desired to permit varying the angular position of one indicator hand relatively to the other.

6. In a scale and in combination with the weighing mechanism thereof, a pair of indicator hands, a hollow shaft connected with the weight-offsetting mechanism for rotation thereby and carrying one of said hands, a second shaft arranged concentrically within the hollow shaft, clutch members respectively mounted at opposite ends of said hollow shaft, a clutch member firmly secured to said second shaft, a clutch member slidably mounted upon said second shaft and carrying the second indicator hand, a spring arranged to normally press the clutch members upon the second shaft into engagement with those upon the hollow shaft, means for separating the clutch members by axial motion of the clutch members upon the second shaft to permit angular movement of the second indicator hand relatively to the first indicator hand.

7. In a scale and in combination with the weighing mechanism thereof, a pair of indicator hands arranged for simultaneous rotation upon movement of the weighing mechanism, means for moving one of said indicator hands into various angular positions relatively to the second indicator hand, a lever pivoted to the scale frame and carrying indicator hand retaining means for holding the hand against movement in either direction, and means for moving said lever into position to engage the movable indicator hand so as to register and retain said hand.

8. In a scale and in combination with the weighing mechanism thereof, a pair of indicator hands clutch-connected for simultaneous rotation upon movement of the weighing mechanism of the scale, concentric shafts respectively carrying the indicator hands, means for disconnecting said indicator hands and moving one of the hands relatively to the other, and means for positioning said movable hand at a definite point on the chart of the scale arranged to be operated by an axial movement of one of said shafts.

9. In a scale and in combination with the weighing mechanism thereof, a pair of indicator hands clutch-connected for simultaneous rotation upon movement of the weighing mechanism of the scale, concentric shafts respectively carrying the indicator hands, means for disconnecting said indicator hands and moving one of the hands relatively to the other, and means for positioning said movable hand at a definite point on the chart of the scale arranged to be operated by an axial movement of one of said shafts, including a lever having a guide member movable into position to engage the hand.

10. In a scale and in combination with the weighing mechanism thereof, a pair of indicator hands clutch-connected for simultaneous rotation upon movement of the weighing mechanism of the scale, concentric shafts respectively carrying the indicator hands, means for disconnecting said indicator hands and moving one of the hands relatively to the other, and means for positioning said movable hand at a definite point on the chart of the scale arranged to be operated by an axial movement of one of said shafts, including a lever having a notched guide member movable into position to engage the hand.

11. In a scale and in combination with the weighing mechanism thereof, a pair of indicator hands clutch - connected for simultaneous rotation upon movement of the weighing mechanism of the scale, concentric shafts respectively carrying the indicator hands, means for disconnecting said indicator hands and moving one of the hands relatively to the other, and means for positioning said movable hand at a definite point on the chart of the scale arranged to be operated by an axial movement of one of said shafts, including a lever having a guide member with inclined walls movable into position to engage the hand.

12. In a scale and in combination with the weighing mechanism thereof, a hollow shaft arranged for rotative movement upon movement of the weight-offsetting mechanism of the scale, an indicating hand secured thereto, a second shaft connected with said hollow shaft rotatably supported therein, a second indicator hand supported thereby and normally clutch-connected to the first indicator hand so as to rotate therewith, and means for producing axial motion between the second shaft and the indicator hand supported thereon to release the clutch and permit a change in the angular relation of said hands.

13. In a scale and in combination with the weighing mechanism thereof, a hollow shaft arranged for rotative movement upon movement of the weight-offsetting mechanism of the scale, an indicating hand secured thereto, a second shaft rotatably supported within said hollow shaft, a second indicator hand supported on said second shaft so as to rotate and slide longitudinally thereon, two clutch members respectively secured to the ends of said hollow shaft, two coöperating clutch members respectively secured to said second shaft and to said second indicator hand, and means for producing relative axial motion of said shaft and said second indicator hand to release said clutch members and permit change in the angular relation of the indicator hands.

EDWARD G. THOMAS.

Witnesses:
A. H. BEELEY,
H. H. LYBRAND.

Copies of this patent may be obtained for five cents each, by addressing the "Commissioner of Patents, Washington, D. C."